(12) United States Patent
Boaz

(10) Patent No.: US 6,277,492 B1
(45) Date of Patent: Aug. 21, 2001

(54) PROVIDING ORGANIC PAINT ON GLASS TO MATCH AUTOMOTIVE BODY COLOR

(75) Inventor: Premakaran Tucker Boaz, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/110,832

(22) Filed: Jul. 6, 1998

(51) Int. Cl.$^7$ ....................................................... B32B 17/06
(52) U.S. Cl. ........................... 428/426; 428/429; 428/432; 428/442; 428/335; 428/357
(58) Field of Search ..................... 428/429, 442, 428/426, 428, 432, 357, 335, 330, 336, 446, 447; 526/272; 525/285, 288

(56) References Cited

U.S. PATENT DOCUMENTS

| | | |
|---|---|---|
| 5,075,382 | 12/1991 | Ohmae et al. . |
| 5,378,535 | 1/1995 | Moncur et al. . |
| 5,378,727 | 1/1995 | Bovy et al. . |
| 5,466,727 | 11/1995 | Hsieh . |
| 5,468,317 | 11/1995 | Hsieh . |
| 5,698,026 | 12/1997 | Boaz . |

*Primary Examiner*—Merrick Dixon
(74) *Attorney, Agent, or Firm*—Steven L. Oberholtzer; Brinks Hofer Gilson & Lione

(57) ABSTRACT

A process for adhering a layer of organic paint to the surface of a glass sheet, and the products produced thereby. The process comprises applying a layer of a water-based silicate paint to the surface of the glass sheet, heating to cure the paint, forming the glass sheet into a shape, sensitizing the water based paint with a layer of silane material, applying a layer of organic paint over the layer of sensitized water-based silicate paint, and curing the organic paint to provide organic paint adhered to the glass surface.

10 Claims, No Drawings

PROVIDING ORGANIC PAINT ON GLASS TO MATCH AUTOMOTIVE BODY COLOR

FIELD OF THE INVENTION

This invention relates generally to glass sheets having painted exterior surfaces. More particularly, the invention is directed to a method for painting the exterior surfaces of glass sheets with successive layers of paints which provides an aesthetically appealing yet durable product useful for automotive and architectural glazings.

BACKGROUND OF THE INVENTION

It would be desirable for automotive styling opportunities to be able to apply a band of colored organic paint around the periphery of an automotive vehicle glass to match the paint color of the vehicle. Presently, organic paints would not be sufficiently adherent to the glass surface to allow their use directly on glass in most commercial applications. The present inventor, in U.S. Pat. No. 5,328,753, disclosed the use of a metal-containing ceramic paint as an interlayer between the glass and organic paint to provide adherence therebetween. The paint was disclosed to have ceramic frit, pigment, an organic vehicle like pine oil, and metal powder. The metal powder was taught to keep the ceramic paint from adhering to the mold during glass shaping operations and hence prevent the formation of surface defects. One drawback with that invention is that the ceramic paint uses organic solvents which are less than environmentally desirable. Further, the ceramic paint, until it is cured at high temperatures, is prone to scratching during handling. Therefore, the use of the ceramic paint to provide adhesion between the glass and the organic paint has drawbacks which make such use less than optimal.

In another U.S. Pat. No. 5,698,026, the present inventor discloses a water based silicate paint useful on automotive glass, such as around the periphery for "black out" of the glass areas. I have now unexpectedly found that the water-based paint can be used to adhere the organic paint to glass but only if the water-based paint is contacted with a silane sensitizer material prior to the application of the organic paint. Use of only the water-based paint on the glass, without sensitizer, was found by the inventor to not provide good adhesion of the organic paint to the glass. The use of the water-based paint to adhere the organic paint to the glass has advantages as compared to using the ceramic paint for that function as in U.S. Pat. No. '753 noted above. That is, the water-based paint can be cured at lower temperatures to avoid distorting the glass and avoids the used of organic solvents which provides commercial and environmental benefits. In addition, I have unexpectedly found that the water-based paint, after it is cured, has a rougher surface than the ceramic paint of the '753 patent which is advantageous to adhering the organic paint thereto. I believe this roughness results from the evaporation of the water during curing. Hence, this improves the adhesion of the organic paint to the sensitized water based paint as compared to only glass treated with a sensitizer.

SUMMARY OF THE INVENTION

The present invention is a method for providing a coating of organic paint on a glass sheet, the process comprises the steps of:
A) applying a layer of a water-based silicate paint to a surface of the glass sheet and curing the paint at a temperature below the plastic set temperature of the glass sheet;
B) heating the glass sheet to its plastic set temperature and shaping the glass sheet;
C) coating the water-based silicate paint with a layer of a silane material useful to sensitize the paint; and
D) applying a layer of an organic paint over the layer of sensitized water-based silicate paint and curing the organic paint.

The water-based paint comprises water-soluble silicate, water, water-soluble base, finely divided metal oxide powder, soda-lime-silica glass powder, and, optionally, at least one of zinc oxide and low-melting frit. More particularly, this water-based paint comprises:
(i) water-soluble sodium silicate forming 20 to 45 weight percent of said composition;
(ii) water forming 5 to 25 weight percent of said composition;
(iii) water-soluble base in an amount sufficient to provide said composition with a pH of at least 10.5;
(iv) finely divided metal oxide powder selected from the group consisting of oxides of copper, iron, nickel, cobalt and mixtures thereof forming 20 to 45 weight percent of said composition and having a particle size, on average, less than 7 microns; and
(v) particles of soda-lime-silica glass forming 3 to 55 weight percent of the composition and having a diameter, on average, less than 20 microns and having a melting point of at least about 1700° F.

The paint further comprises at least one material selected from the group consisting of:
(vi) low-melting glass frit powder melting below 1300° F. forming up to 20 weight percent of said composition and having a particle size, on average, less than 10 microns; and
(vii) zinc oxide forming up to 10 weight percent of said composition. In addition, preferably the composition comprises small amounts of aluminum hydroxide.

The painted glass sheets of the present invention are particularly well suited for preparing automotive or architectural glazings having concealment bands on the exterior (i.e., facing the outer environment) surfaces thereof.

Advantageously, the invention provides excellent adherence of an organic paint to glass in an environmentally desirable way through the use of water-based paint and silane sensitizer.

DETAILED DESCRIPTION OF THE PREFERRED EMBODIMENT

The present invention is directed to a process for painting the surface of a glass sheet, by applying consecutive layers of a water-based silicate paint, a silane sensitizer for the paint, and thereafter an organic paint. The surface to be painted may be the exterior surface of the glass sheet since the invention product has been found to be of excellent durability. By the term "exterior" as it is used herein is meant that surface of the glass sheet which is intended to be exposed to the corrosive and erosive effects of the atmosphere exterior of the vehicle or building enclosed by the glass sheet. As would be appreciated, the paint may be applied to other than exterior glass surfaces, for example, in a laminated windshield it may be applied to one of the surfaces which contact the interlayer between the glass sheets. By the term "surface of the glass sheet" as it is used herein is meant the entire area of either major surface of the glass sheet, or any portion thereof.

According to the present invention, the glass sheet is provided first with a coating of a water-based silicate paint in an area on which it is intended that the organic paint is to be located. Two embodiments of useful water based silicate paints are disclosed in U.S. Pat. No. 5,698,026 and its CIP U.S. patent application Ser. No. 08/972832 filed Nov. 18, 1997, the teachings of both of these documents being expressly incorporated by reference herein. As disclosed above, the water-based silicate paint broadly includes water-soluble silicate, water, water-soluble base, finely divided metal oxide powder, soda-lime-silica glass powder, and at least one of zinc oxide and low-melting frit.

Water-soluble sodium silicates form between about 20 and 45 weight percent of the composition of this invention, more preferably, between about 30 and 38 weight percent of the composition, i.e., as used herein "weight percent of the composition" meaning a fraction of the total weight of the composition. They may comprise a single sodium silicate or a mixture of silicates. In addition to the water-soluble sodium silicate, water-soluble potassium silicates of similar formula may also be included in the composition.

Yet another required component of the composition is water which is included in an amount between about 5 and 25 weight percent of the total composition weight, preferably in an amount between about 10 and 25 weight percent. The composition also includes a water-soluble base which is employed to provide the paint composition with a pH of at least about 10.5, preferably being above 12.5, more preferably about 13.5. The pH is required to be on the basic side as is indicated by the required pH. Examples of water-soluble bases which may be employed include but are not limited to sodium hydroxide and potassium hydroxide, with sodium hydroxide being preferred. It is generally included in about 2 to 10 weight percent of the composition, more preferably in about 3 to 8 weight percent, and most optimally, in about 3 to 6 weight percent.

The composition further comprises finely divided metal oxide pigment selected from copper oxide, iron oxide, nickel oxide, cobalt oxide and mixtures thereof, with the inclusion of copper oxide being preferred. This pigment gives the paint a black color and forms 20 to 45 weight percent of the composition, preferably between about 30 to 40 weight percent of the composition. The finely divided powder pigment has a particle size (diameter) on average less than about 7 microns, preferably being between about 3 and 7 microns, most preferably being about 5 microns. These compositions would vary in color from black to dark gray, depending on the mixture and percentages of the metal oxides. Copper oxide, which is preferred, provides a black paint composition, and the paint is desirably chromium-free.

The ability of the water-based paint composition to maintain its excellent physical properties at the very high temperatures experienced during tempering of the glass is significantly enhanced by the including particles of soda-lime-silica glass in the paint composition. The particles are made of any soda-lime-silica glass, this type of glass being well known in the glass industry. Soda-lime-silica glass is used in the automotive and architectural industries and is generally characterized by the following basic composition, the amounts of the components being based on a weight percentage of the total glass composition: silicon dioxide 68–75; aluminum oxide 0–5; calcium oxide 5–15; magnesium oxide 0–10; sodium oxide 10–18; and potassium oxide 0–5. Additionally, the calcium oxide+magnesium oxide is 6–15%, and sodium oxide+potassium oxide is 10–20%. Soda-lime-silica glasses, either with or without colorants often added in or other additives may be used in the present invention paint composition. Desirably, the glass particles included in the paint composition would be similar or identical to the glass on which the paint will be applied, however, such is not necessary. The glass particles may be in powder or spherical form. Generally, the diameter of the particles is, on average, less than 20 microns, being preferably 3 to 15 microns. More preferably, the particles have a diameter in the range of about 5 to 7 microns.

The soda-lime-silica particles are included in the paint composition in an amount from 3 to 55 weight percent based on total weight of the paint composition. Preferably, the amount of high-melting glass particles in the water-based paint is from 5 to 45 wt. percent, optimally being 7 to 40 wt. %. Spherical particles are preferred and are commercially available, for example, from Cataphote Inc., under the name GLASS SHOT™ glass particles. In the case of spherical particles the size may be 5 to 20 microns or even smaller since they optimally suitable for use, however smaller sizes are not as readily commercially available.

In addition to the above required components, the paint further includes at least one adhesion promoter selected from the group consisting of: a low melting glass frit powder and zinc oxide. At least one of these materials needs to be included in the paint composition. It is most desirable, however, that only the low-melting glass frit be included in the composition. However, the zinc oxide may be included along with the low-melting glass frit or in place of it. These adhesion promoters have been found to promote the adhesion of the paint to the glass. And, in addition, when the paint is used in contact with vinyl as in a laminated windshield, these adhesion promoters also promote the adhesion of the vinyl to the glass as described below. The paint is able to accommodate a wide range of the low melting frits.

The paint desirably, but optionally, includes a minor amount of a glass frit powder. This glass frit is a glass material which melts below about 1300° F. Optimally it is included in the water based paint composition in an amount comprising up to about 20 weight percent, more preferably being between about 2 and 10 weight percent, most preferably being between about 2 and 8 weight percent of the present invention blackish paint composition particularly when the paint is applied to a glass surface which rests against vinyl, e.g., as in a laminated windshield. Most preferably, the low-melting glass frit is present in the composition in an amount of about 5 weight percent, based on the total composition weight. The glass frit, when used, is incorporated into the paint composition in a powder form, the particle diameter being on average less than about 10 microns, preferably being between about 3 and 7 microns, most preferably being on average about 7 microns. Exemplary of preferred glass frit materials useful in the present composition, often referred to as enamel frits, are silicates of metals such as zinc, boron, bismuth, titanium, zirconium, and aluminum and mixtures thereof, e.g., titanium-silicate glass, zinc boro-silicate glass and bismuth boro-silicate glass. These higher levels of glass frit are particularly desirable when the paint is to be used on an outside glass surface, i.e., one which does not rest against the vinyl in a laminated windshield. Many such glass frits are readily commercially available as from General Colors Co. and O. Hommell Co. Still other glass frits which may be employed in the present invention will be apparent to those skilled in the art in view of the present disclosure. I have found that including this low-melting frit powder in the glass composition significantly improves the adhesion of the paint to the glass, to PVB or urethane sealants when used in contact with the paint.

Another optional component which may be included in the water-based paint is zinc oxide as another adhesion promoter. When included in the composition, it comprises generally about up to 10 weight percent, preferably being 2 to 10 weight percent, and more preferably between about 3 and 6 weight percent. Optimally, when included, it comprises between about 4 and 6 weight percent based on the weight of the composition. The zinc oxide is preferred to be provided in the paint composition in a particle size of between about 2 and 3 microns on average, however particle size is not critical.

Still another optional, but desirable, component included in the water-based paint composition of this invention is a surfactant. Surfactants are well known materials and often added to paints to improve the wetting characteristics of the liquid paint to the substrate to which it is applied. Exemplary of one such material is "FC-171" made by 3M Company. Still other surfactants are known to those skilled in the art. Desirably, it forms about 0.1 to 1.0 weight percent of the paint composition, more preferably about 0.25 to 0.5 weight percent. Another optional but desirable component is aluminum hydroxide which is preferably included in the composition in up to about 5% by weight of the composition. It is generally added to the paint as aluminum hydroxide hydrate and has been found to increase the shelf life of the paint and may increase the adhesion of the paint to the glass sheet. Still other materials may be included in the water based paint to improve its flowability as would be apparent to those skilled in the art in view of the present disclosure.

To make the water-based paint composition, the components are generally added together and then ball milled until a substantially uniform mixture of components is obtained. The water-based paint may be applied to a glass substrate substrate by any technique. The glass sheet may be prepared from any type of glass generally known in the art of glass making. Typical glass sheets contemplated for use according to the present invention are soda-lime-silica automotive and architectural glazings, generally produced by the well-known float glass process.

In operation, the water-based paint is applied as a uniform layer to a surface of the glass sheet in a predetermined pattern, this predetermined pattern to be that of the organic paint top layer according to the present invention. This may be done by a conventional paint application method, e.g., screen printing wherein the paint is spread across the screen by a squeegee to force the paint through the pattern onto the glass sheet. It is well known in the painting arts to apply a band of paint to the surface of an automotive glazing by screen printing. In such a situation, it is particularly desirable to maintain a moist environment surrounding the paint during the screening process. Optimally the moist environment is maintained about 70+5% rh with the present invention preferred paint compositions. Maintaining this moist environment allows for prolonged use of the paint application screen system by maintaining the moisture content of the paint at a desirable viscosity for application. This environment may be optimally provided, e.g., by the invention described in U.S. Pat. No. 5,509,964 to Boaz and commonly assigned with this invention. It is entitled "Apparatus and Method for Applying a Coating to Glass".

The predetermined pattern in which the water based paint may be applied to a glass sheet may comprise, for example, an opaque concealment band positioned on a peripheral marginal surface of an automotive glazing. Such concealment bands are well known in the art of automotive glazings as useful for preventing the solar radiation induced degradation of adhesives used to mount the glazings in a vehicle opening, and for concealing attachment hardware and structural components which lie below the edges of the glazings. The band generally extends to the edges of the glazings, and has a width sufficient to conceal the underlying adhesive and structural components, but which is sufficiently narrow to provide maximum vision to occupants of the vehicle. Clearly, other predetermined patterns, including decorative patterns, may be utilized when applying various paint fields to glass surfaces, depending upon the ultimate purpose for the organic paint field. As discussed above, the paint may be applied on any glass surface, exterior, interior, or surfaces within a laminate contacting a vinyl interlayer.

In the case of paint patterned on automotive glass as "black out", the water based coating is preferably provided in a thickness of about 12–16 microns. The coating may be applied in any thickness, however, the optimal thickness being determined by the particular application desired.

The water-based paint composition, after being applied to a substrate, is readily cured by baking at an elevated temperature for a time sufficient to drive off the water which cures the coating. This step may be carried at any temperature, but desirably at a temperature below the softening point of the glass. Since this water vaporization and curing can be preferably carried out at moderate temperatures, e.g., below about 400° C., even between about 100° C. and 200° C., the painted glass is not subjected to softening and hence is prevented from being distorted during the moderate temperature.

This drying and curing of the water-based paint composition may be carried out by any means. Two particularly preferred means comprise subjecting the paint applied to the glass to Infra Red (IR) radiation or microwave radiation as in a microwave oven. The latter is most particularly preferred because it may be provided as a compact unit of relatively small size, it consumes less energy and generally requires less maintenance. After the water-based paint is applied on the glass surface and cured, the glass is heated and bent into shape, i.e., it is conveyed through a furnace where the glass sheet is heated to its plastic set temperature. By the term "plastic set temperature" as the term is used herein is meant that temperature below which an applied stress will not cause permanent deformation of the glass sheet, and above which the glass sheet is capable of being permanently bent or shaped such as by gas hearth forming, sag forming, quick sag forming. Generally, the shaping involves subjecting the glass to high temperatures of the order of 1150° F. or more in a lehr, which can be 1250° F. or more if the glass is tempered. This will allow the coating to further cure, although such is not required to provide a durable and adherent coating on a substrate. One particularly commercially desirable feature of the water-based paint is that when it cures at the low temperatures described above, it is sufficiently durable that it can be passed "paint side down" on the conveyers without the paint being scratched. During the conveying of the glass sheet through the furnace, the water-based silicate paint is further fused to the surface of the glass sheet.

After shaping the glass sheet having the water-based silicate paint layer thereon, the paint layer is coated with a silane sensitizer material. This material is of the type disclosed, e.g., in "Automotive Sealants and Silane Coupling Agents", pages 147–153,Polyurethane Sealants, Robert M, Evans, Technomic Publishing Company, Inc., 1993, the teachings with respect to silane coupling agents being expressly incorporated by reference herein. Silane materials useful in this invention are generally organosilane materials such as those commercially available from Essex Speciality Products, Inc, Auburn Hills, MI under the tradename BETASEAL 43519. Generally, the layer of silane sensitizer may be applied to the cured water-based paint by means such as painting, spraying, flow, dip, or wipe-on from a solution containing non-reactive diluents which may be organic solvents. Preferably the thickness of the wet layer is about 0.0008+/−0.0002 inches, more preferably about 0.0015–0.0004 inches. By applying a very thin layer, such as less than 0.001 inch, is may be more easily prevented from spreading over the unpainted area of the glass due to gravity. If the silane material is applied from a solvent solution thereof, it is allowed to dry to evaporate the solvents, which drying may be conducted at elevated temperature. Optimally the layer is applied in a thickness so as to provide a final dried silane layer which is a mono-molecular layer, since such thickness of the layer is believed to provide maximum durability/adhesion to the final product. Correspondingly, optimal thickness of the final dried silane layer is about 40 microns. Generally, for optimal adhesion, the sensitizer layer is expected to be applied over the entire area of the water-base paint which is later to be coated over with the organic paint.

A layer of an organic paint is applied over the layer of sensitized water-based silicate paint. The organic paint, which otherwise would not suitably chemically bond to the surface of the water-based paint or the glass sheet alone for commercial use, adheres tenaciously to the sensitized water-based silicate paint layer. While the referenced U.S. Pat. No. 5,328,912 discloses the use of a ceramic paint as an interlayer between the glass and an organic paint, that system had several drawbacks. For example, as discussed above, including use of a ceramic paint which is not water-based but includes organic vehicles, raise environmental concerns. Further, the ceramic paint did not cure at a low temperature as does the water-based paint and so the glass had to be heated to its softening temperature to cure and fuse the ceramic paint before it could be molded and hence could not be processed paint side down on the rollers prior to the high temperature fusion.

The organic paint which is placed over the sensitized/water-based paint may be selected from any of the paints which are known as useful for decoration articles. Organic paints generally comprise a pigment, a solvent, and an organic base material such as, for example, an acrylic, urethane, cellulosic, alkyd, epoxy, fluorocarbon, phenolic, polyamide, polyurethane, or vinyl resin, as well as blends and copolymers thereof. Preferred paints include enamels, epoxy-based paints, and lacquers such as those currently used in the automotive industry. Urethane paints are preferred as they optimally have the most excellent adhesion to the glass using the water based sensitized paint layer. It will be apparent to those normally skilled in the art that more than one organic paint layer may be applied to the layer of water-based paint, depending upon the appearance desired.

As discussed above, and as noted from the following examples, the use of both the water-based paint and the sensitizer is critically necessary to bond the organic paint to the glass. Use of only the water-based paint or only a silane sensitizer layer between the glass and the organic paint does not provide the required adhesion of the organic paint. It is only when the water-based paint and then the silane sensitizer are provided, in that order, on the glass does the organic paint have excellent adhesion to the glass. I believe that the water-based paint adheres tenaciously to the glass and then the sensitizer modifies the surface of this water based paint so that it is more adherent to the organic paint. In particular, I believe that the sensitizer provides a chemical link between the water based paint and the organic paint. In addition and perhaps more critically, I believe that the water based paint when it is dried develops sub-micron pores at the sites of water evaporation. These pores are available to be filled up with sensitizer to form a mechanical bond with the water-based paint. I believe that this provides additional adhesion between the water based paint and the sensitizer layer, i.e., chemical as well as mechanical bonding. In contrast, with a conventional ceramic paint, such pores are not expected to exist since during the high temperature curing of the ceramic paint its components flow providing a smooth surface. Silicates do not flow at normal glass forming temperatures. Neither the validity or understanding of this theory is necessary, however, for the practice of this invention. Rather, I have presented it in an attempt to explain the unexpected results obtained according to my invention.

The following examples are presented by way of description of the invention and to set forth the best mode contemplated by the inventor, but are not to be construed as limiting.

EXAMPLE 1

A layer of water based silicate paint was screen printed as a peripheral band on a soda-lime-silica glass sheet which is to be part of a automotive windshield. The paint includes the following components, by weight: 37% sodium silicate, 5% water, 40% copper oxide, 7% soda-lime-silica glass powder, 6% low melting glass powder (Ohommel 1-78-95-82), 5% zinc oxide.

The water was evaporated at room temperature to cure the paint and then the painted sheet was formed into windshield shape at elevated temperatures of about 1200° F. This painted surface is to be on the outside of the automotive vehicle when later assembled into the windshield.

A layer of silane sensitizer (BETASID 43519, 2% silane and the balance solvent, available form Essex Specialty Products) is applied over the water based paint. A shielding device was used to keep the sensitizer from being applied over the uncoated glass area. The sensitizer layer was dried to evaporate the solvent.

A urethane paint (GLASURIT-55 available from BASF) was applied over the sensitized water based paint and then dried at about 160° F. for ten minutes. The cured organic paint was adherent to the glass according to an embodiment of the present invention.

EXAMPLE 2

Another painted glass sample according to another embodiment of the present invention was made as above except that the organic paint was a acrylic paint provided by BASF Corp.

For comparison, other samples were made except that a sensitizer was not used and the organic paint was applied either directly on the glass or over a water based paint on the glass.

The samples were subjected to tests to determine the adhesion of the organic paint to the glass. The adhesion tests was carried out by applying a tape to the paint and then pulling off the tape to see whether any paint adheres to the tape.

The tests results of the adhesion tests on the samples described above are shown in the following tables.

| No Sensitizer/adhesion: | |
| --- | --- |
| Acrylic paint/glass | poor |
| Acrylic paint/water based paint/glass | poor |
| Urethane paint/glass | poor |
| Urethane paint/water based paint | poor |

It can be seen that without sensitizer, all samples fail.

| With Sensitizer/adhesion: | |
| --- | --- |
| Acrylic paint/sensitizer/glass | medium |
| Acrylic paint/sensitizer/water based paint/glass | med/high |
| Urethane paint/sensitizer/glass | medium |
| Urethane paint/sensitizer/water based paint/glass | high |

The use of the water based paint was found to improve the adhesion of the acrylic paint and the urethane paint over that of sensitizer alone. Most commercially desirable for durability is the use of the urethane paint over the sensitized water based paint.

This invention is more easily comprehended by reference to the specific embodiments described herein what are representative of the invention. It must be understood, however, that the specific embodiments are provided only for the purposes of illustration and understanding, and that the invention may be practiced otherwise than as specifically described without departing from its spirit or scope.

What is claimed is:

1. A painted glass sheet comprising:
   A) a sheet of glass having a surface;
   B) a layer of water-based paint adhered to said surface the composition of said water-based paint comprising:
      (i) water-soluble sodium silicate forming 20 to 45 weight percent of said composition,
      (ii) water forming 5 to 25 weight percent of said composition;
      (iii) water-soluble base in an amount sufficient to provide said composition with a pH of at least 10.5;
      (iv) finely divided metal oxide powder selected from the group consisting of oxides of copper, iron, nickel, cobalt and mixtures thereof forming 20 to 45 weight percent of said composition and having a particle size, on average, less than 7 microns;
      (v) particles of soda-lime-silica glass forming 3 to 55 weight percent of said composition and having a diameter, on average, less than 20 microns and having a melting point of at least 1700° F.; and at least one material selected from the group consisting of:
      (vi) low-melting glass frit powder melting below 1300° F. forming up to 20 weight percent of said composition and having a particle size, on average, less than 10 microns;
      (vii) zinc oxide forming up to 10 weight percent of said composition;
   (C) a layer of sensitizing material comprising silane over said layer of water-based paint; and
   (D) a layer of organic paint adhered to said layer of sensitized water-based paint.

2. The painted glass sheet according to claim 1, wherein the glass is formed by press bending.

3. The painted glass sheet according to claim 1, wherein said sheet of glass is formed by at least one process selected from the group consisting of gas hearth forming, sag forming, and quick sag forming.

4. The painted glass sheet according to claim 1, wherein said composition of said water-based paint further comprises potassium silicate.

5. The painted glass sheet according to claim 1, wherein said composition of said water-based paint further comprises aluminum hydroxide.

6. The painted glass sheet according to claim 1, wherein the organic paint is selected from the group consisting of enamels, epoxy-based paints, and lacquers.

7. The painted glass sheet according to claim 1, wherein the low-melting glass frit is a metal silicate wherein said metal is selected from the group consisting of zinc, boron, bismuth, titanium, zirconium, and aluminum and mixtures thereof.

8. The painted glass sheet according to claim 1, wherein the organic paint forms a concealment band on the exterior surface of an automotive glazing.

9. The painted glass sheet according to claim 1, wherein the silane sensitizing materials are organic silane materials.

10. The painted glass sheet according to claim 1, sheet of wherein said glass is automotive or architectural glass.

* * * * *

UNITED STATES PATENT AND TRADEMARK OFFICE
CERTIFICATE OF CORRECTION

PATENT NO.   : 6,277,492 B1                                                              Page 1 of 1
DATED        : August 21, 2001
INVENTOR(S)  : Premakaran Tucker Boaz It is certified that error appears in the above-identified patent and that said Letters Patent is hereby corrected as shown below:

<u>Column 10,</u>
Line 19, delete "the glass" and substitute -- said glass -- in its place.
Line 32, delete "the organic" and substitute -- said organic -- in its place.
Line 35, delete "the low-melting" and substitute -- said low-melting -- in its place.
Line 40, delete "the organic" and substitute -- said organic -- in its place.
Line 43, delete "the silane" and substitute -- said silane -- in its place.
Line 44, delete "sheet of" and in line 2, after "said" insert -- sheet of --.

Signed and Sealed this

Fourteenth Day of May, 2002

*Attest:*

*Attesting Officer*

JAMES E. ROGAN
*Director of the United States Patent and Trademark Office*